United States Patent [19]
Fernandez et al.

[11] Patent Number: 6,052,686
[45] Date of Patent: Apr. 18, 2000

[54] DATABASE PROCESSING USING SCHEMAS

[75] Inventors: Maria F. Fernandez, Cranford; Dan Suciu, Mountainside, both of N.J.

[73] Assignee: AT&T Corporation, New York, N.Y.

[21] Appl. No.: 08/933,197

[22] Filed: Sep. 18, 1997

Related U.S. Application Data

[60] Provisional application No. 60/052,908, Jul. 11, 1997.

[51] Int. Cl.[7] .................................................. G06F 17/30
[52] U.S. Cl. ................................................. 707/100; 707/3
[58] Field of Search .................................... 707/100, 101, 707/102, 2, 3, 4, 5

[56] References Cited

U.S. PATENT DOCUMENTS

| | | | |
|---|---|---|---|
| 5,418,942 | 5/1995 | Krawchuk et al. | 707/3 |
| 5,495,605 | 2/1996 | Cadot | 707/4 |
| 5,564,119 | 10/1996 | Krawchuk et al. | 707/4 |
| 5,590,319 | 12/1996 | Cohen et al. | 707/4 |
| 5,600,829 | 2/1997 | Tsatalos et al. | 707/2 |
| 5,600,831 | 2/1997 | Levy et al. | 707/2 |
| 5,606,690 | 2/1997 | Hunter et al. | 707/5 |
| 5,758,353 | 5/1998 | Marquis | 707/201 |

OTHER PUBLICATIONS

Buneman et al., A query language and optimization techniques for unstructured data, SIGMOD 96, pp. 505–516, Jun. 1996.

Xie et al., Optimization of object queries containing encapsulated methods, CIKM 93, pp. 451–460, Nov. 5, 1993.

*Primary Examiner*—Thomas G. Black
*Assistant Examiner*—Sanjiv Shah
*Attorney, Agent, or Firm*—Oliff & Berridge, PLC

[57] ABSTRACT

An apparatus and method for efficiently processing a database. A structure of the database is constructed into a schema which only includes those structures of the database that are known. Desired information to be extracted from the database is specified using path expressions and an automaton models the path expression. A composite automaton is generated based on the automaton and the schema. The composite automaton is pruned and portions of the database corresponding to the pruned automaton is searched to obtain the desired information. Points within the database may be identified to begin searching for the desired information. These points correspond to states of the composite automaton. A hybrid automaton may be formed for each set of possible starting states to determine completeness by simulating the hybrid automaton against the composite automaton.

36 Claims, 7 Drawing Sheets

DATABASE PROCESSING USING SCHEMAS

This nonprovisional application claims the benefit of U.S. provisional Application Ser. No. 60/052908 entitled "Optimizing regular Path Expressions Using Graph Schemas" filed on Jul. 11, 1997. The Applicants of the Provisional Application are Maria (Mary) F. Fernandez and Dan Suciu.

The Provisional Application is herein incorporated by reference including all the publications cited therein.

BACKGROUND OF THE INVENTION

1. Field of Invention

This invention relates to processing a database using a schema. P 2. Description of Related Art Partially structured databases may be used to model information contained within intra-networks such as network within a company, organization or agency (i.e. intranets). Usually such intra-networks reflect the structure of the respective organizations. Structured database processing techniques are not useful for processing the information in intra-networks because the structure of the intra-networks are not totally known. On the other hand, database processing techniques directed to unstructured databases do not take advantage of the available knowledge regarding the structure of the intra-networks and for that reason are inefficient. Thus, there is a need for techniques that are optimized to process a database for which the structure is partially known.

SUMMARY OF THE INVENTION

This invention provides an apparatus and method for efficiently processing information contained in an intra-network by treating the intra-network as a database and either pruning the database or identifying a point within the database from which to start processing. Known portions of the database structure is modeled as a schema. The schema only includes those structures of the database that are known and accommodates other structures that are unknown.

A desired information to be extracted from the database is specified using a path expressions and an automaton models the path expression. A composite automaton is generated based on the automaton and the schema. The composite automaton is analyzed and pruned by removing broken paths which do not lead to the desired information. The pruned composite automaton corresponds to that portion of the database that must be processed to obtain the desired information. Thus, processing time is reduced because portions of the database not leading to the desired information are not processed.

The composite automaton may also be analyzed to select subsets of starting states which are below the starting state of the composite automaton. Each subset of starting states may be determined to result in the desired information equivalent to starting at the starting state of the composite automaton. Such determination may be obtained by generating a hybrid automaton and simulating the hybrid automaton against the composite automaton to determine their identity. Where a simulation exists, the subsets of starting states may be compared with each other by using a cost model to identify the subset of starting states that results in the lowest processing costs required for obtaining the desired information.

BRIEF DESCRIPTION OF THE DRAWINGS

The invention is described with reference to the following drawings wherein like numerals represent like elements, and wherein.

DETAILED DESCRIPTION OF PREFERRED EMBODIMENTS

Figure 1:
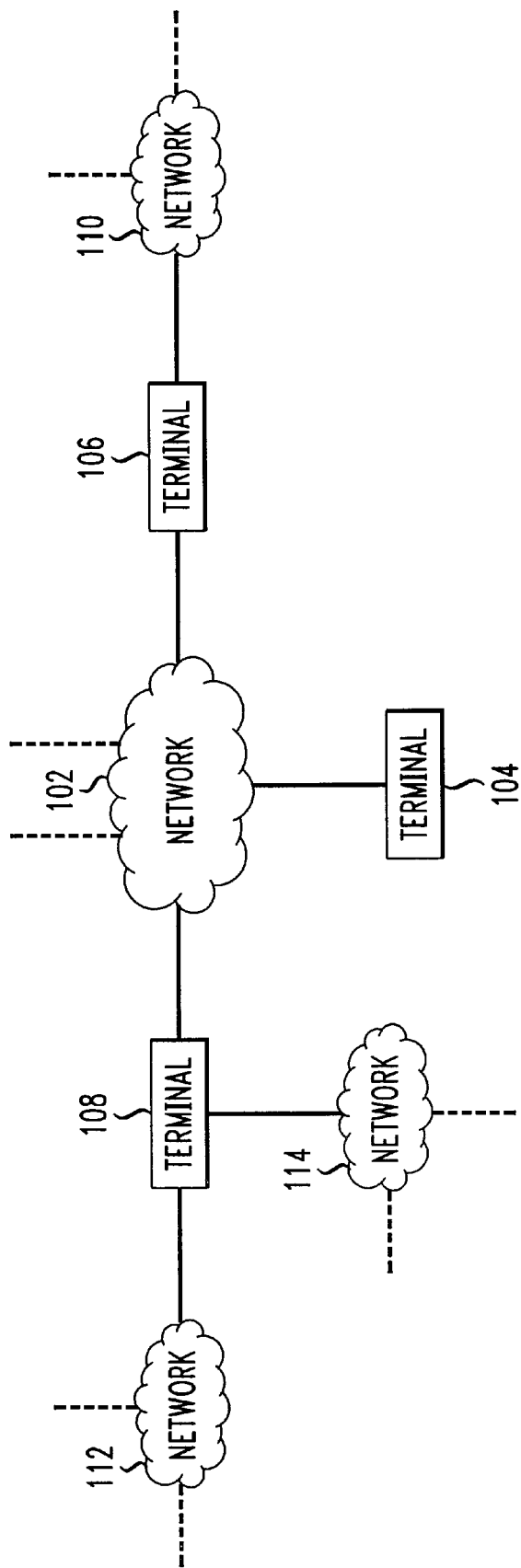
FIG. 1 is a diagram of a network example.

FIG. 1 shows terminals 104, 106 and 108 connected among networks 102, 110, 112 and 114. The networks 102, 110, 112 and 114 may represent intra-networks which are networks internal to an organization such as a corporation. While such networks are largely unstructured, the networks inherently reflect the structure of the respective organizations because the network serve those organizations.

When information contained within the intra-networks are desired, any one of the terminals may access the intra-networks through the appropriate network connections and begin searching for the desired information. The search is greatly enhanced by the partial knowledge of the underlying structure of the organization since this structure is reflected in the structure of the intra-networks. The preferred embodiments provide techniques which are optimized for searching the intra-networks based on available knowledge of the structures of the intra-networks.

Figure 2:
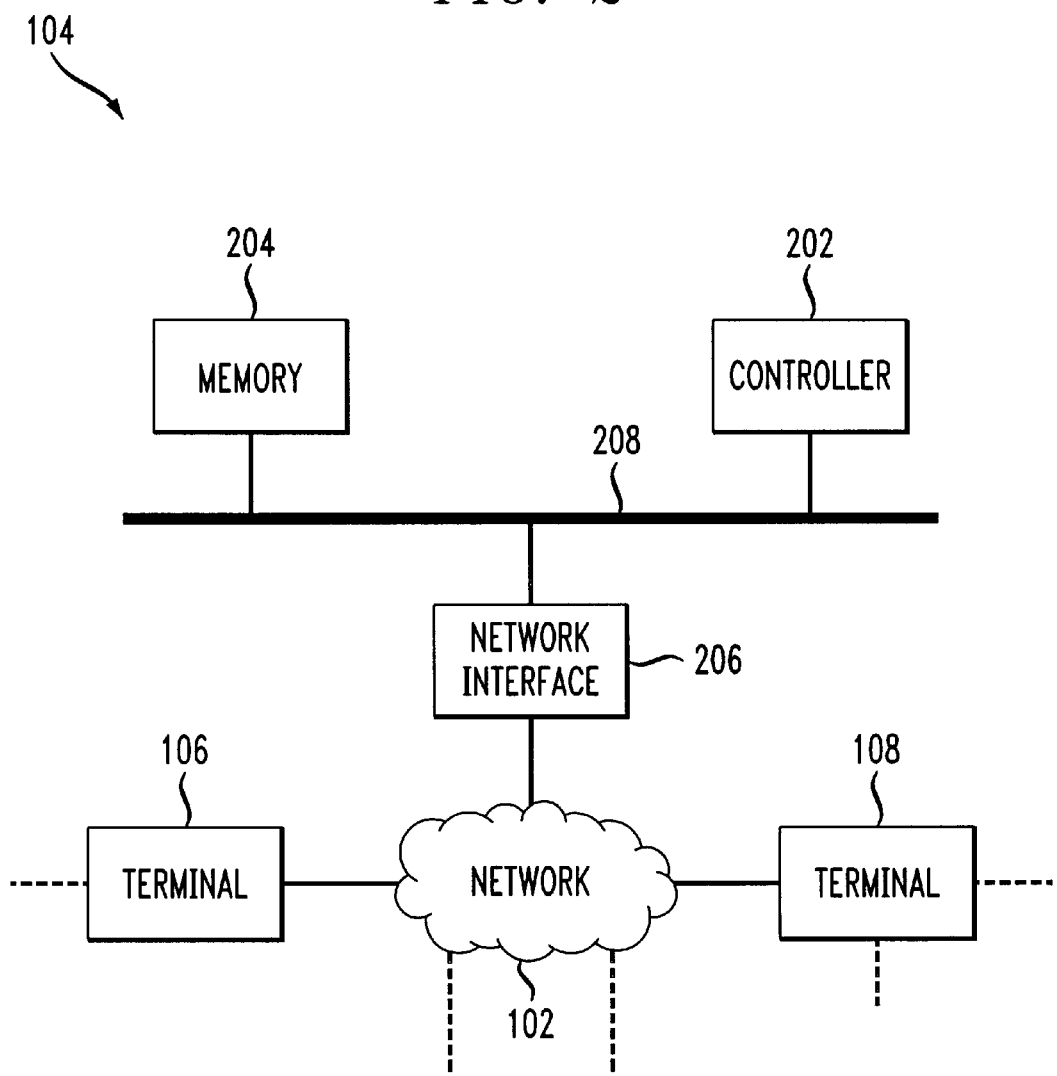
FIG. 2 is a block diagram of a terminal connected to one of the networks of FIG. 1.

FIG. 2 shows a block diagram of one of the terminals, terminal 104, for example. Terminal 104 includes a controller 202, a memory 204 and a network interface 206. The above components are coupled together via bus 208.

The terminal 104 is coupled to the network 102 through the network interface 206. The terminal 104 may search for the desired information from any network/terminals that is accessible through the network interface 206. The terminals 106 and 108 may be devices such as servers and routers and may contain the desired information. Thus, the network 102, 110, 112, and 114 as well as terminals 106 and 108 may be treated as a database that is modeled as an edge-labeled tree. The terminals 106 and 108 may be modeled as nodes of the edge-labeled tree and the path connecting the network interface 206 to a node may be modeled by the edges of the edge-labeled tree.

The edge-labeled tree also may be used to model the information contained in the networks and terminals. Thus, the path leading to the desired information and the information itself may be modeled by the edge-labeled tree. Accordingly, searching techniques for the desired information may be discussed in terms of the edge-labeled tree.

Figure 3:
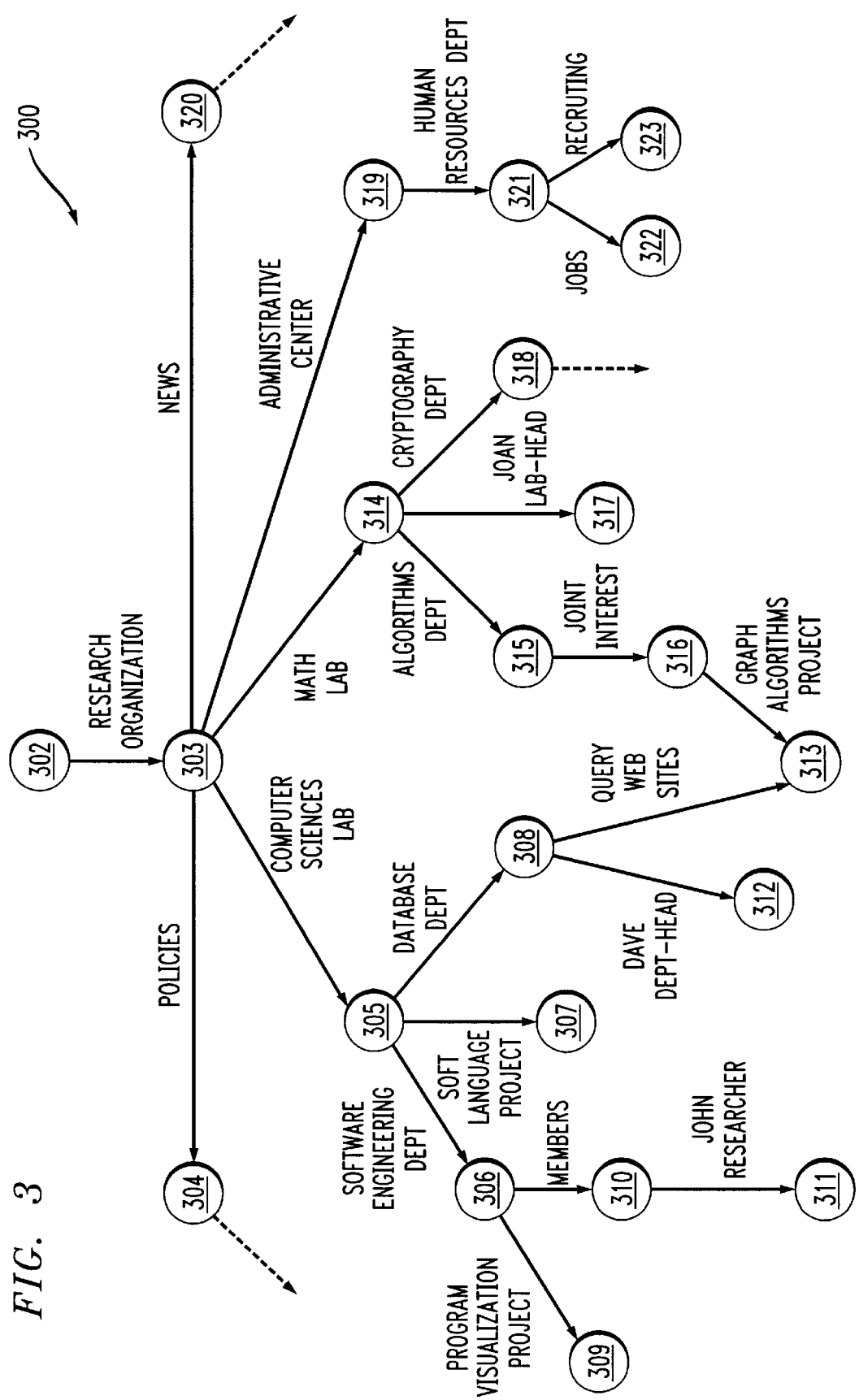
FIG. 3 is an edge-labeled tree modeling one of the networks shown in FIG. 1.

FIG. 3 shows an edge-labeled tree 300 modeling such a database. The edge-labeled tree 300 contains nodes 302–323 interconnected by edges which are labeled by specific edge labels. The terminal 104 searches information by traversing the edge-labeled tree 300. For example, node 302 is a root node and the terminal 104 may start at node 302 and begin accessing the information which are contained in the edge-labeled tree 300.

For example, a Research Organization edge emanates from the node 302 and terminates at node 303. Suborganization edges such as Policies, Computer Sciences Lab, Math Lab, Administrative Center and News emanate from the node 303. In addition, Software Engineering Department and Database Department occur after node 305 under Computer Sciences Lab and, similarly, Algorithms Department and Cryptography Department occur after node 314 under Math Lab. The same is true under Administrative Center. Thus, as the terminal 104 traverses the edge-labeled tree from node 302 to node 311, for example, the information that John Researcher is a member of the Software Engineering Dept is produced.

While the above edges do not follow a rigorous structure, Computer Sciences Lab, Math Lab and Administrative Center may be grouped together and Policies and News may be grouped together. Such characteristics of the edge-labeled tree 300 may be very useful when searching for information in a network. A schema captures these characteristics in a structural form and the schema may be used to improve database processing efficiency.

Figure 4:
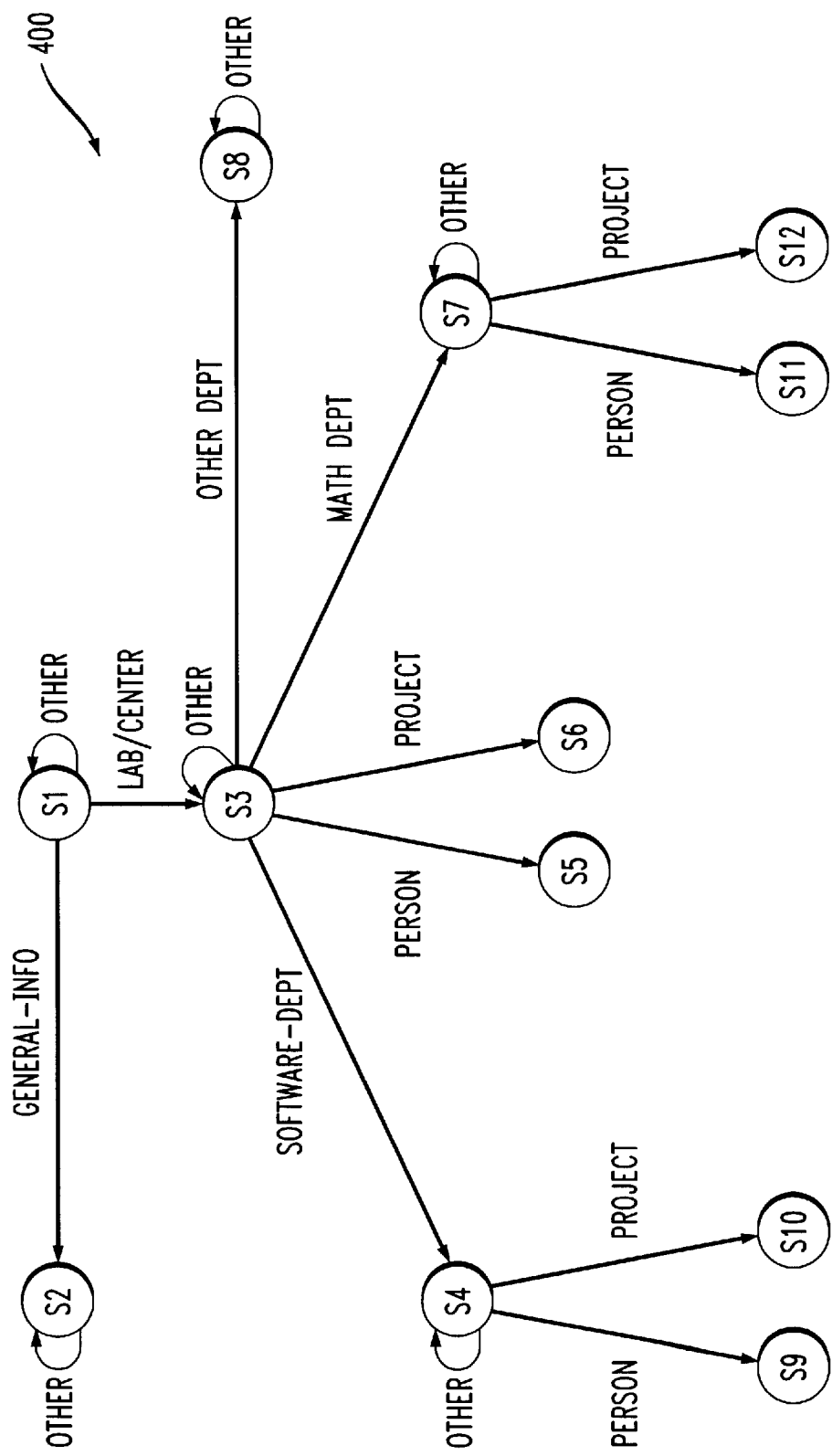
FIG. 4 shows a first schema for the database represented by FIG. 3.

FIG. 4 shows a schema 400 for the edge-labeled tree 300. The schema 400 contains states S1–S12. The states S1–S12 are interconnected by arrows which are labeled. For example, S1 and S2 are interconnected by the General-Info arrow emanating from S1 and terminating at S2. Each of the states S1–S12 corresponds to at least one node in the edge-labeled tree 300. For example, S1 corresponds to nodes 302 and 303; S2 corresponds to nodes 304, 320 and any other nodes below the nodes 304 and 320. All the nodes corresponding to each state is called the extent of that state. Thus, the extent of state S1 includes nodes 302 and 303.

An arrow labeled "Other" both emanates and terminates on state S1. Because the extent of S1 includes multiple states, the Other arrow reflects those edges in the edge-labeled tree 300 that connect the nodes within the extent of the state S1.

By convention, "Other" does not include arrow labels explicitly expressed in the schema. Thus, because General-Info and Lab/Center arrows are explicitly expressed, these arrow labels are not contained in the Other arrow because when encountering either a General-Info or a Lab/Center arrow, the schema indicates that these arrows force a transition from state S1 to state S2 or state S3, respectively.

If all the arrows emanating from a state of a schema have unique labels, then the schema is said to be deterministic. Thus, a deterministic schema has only one arrow that is labeled by one unique label. The requirement that Other arrows only include arrow labels not explicitly expressed permits Other arrows to emanate from a state together with arrows having express arrow labels for deterministic schemas.

An arrow of a schema that emanates from a state represents a group of edges of the corresponding edge-labeled tree. Usually each arrow label of a schema is associated with a list of labels of the edge-labeled tree. Thus, transitioning from one state of the schema to another state of the schema means that one of the labels of the edge-labeled tree that is included in the list corresponding to an edge of the schema is encountered.

For example, a schema 400 shown in FIG. 4 includes a General-Info arrow and a Lab/Center arrow. A list associated with General-Info may include the Policies and the News labels of the edge-labeled tree 300 and a list associated with the Lab/Center arrow may include the Computer Sciences Lab, the Math Lab, and the Administrative Center labels of the edge-labeled tree 300. Thus, the Math Lab label, for example, causes a transition from S1 to S3 in the schema 400.

To process a database for desired information, a deterministic schema, such as the schema 400, is used to eliminate portions of the edge-labeled tree 300 that do not contain the desired information. For example, if it is desired to make a list of all the projects under the departments of labs or centers, then the extent of S2 may be eliminated from the search because none of the edges below the General-Info edge is a Lab/Center edge. If a Lab/Center edge does occur below the General-Info edge, the corresponding nodes would have been included in the extent of state S1. Thus, the General-Info edge and the extent of the state S2 may be ignored when constructing the above list.

A technique to comprehensively determine which portions of the edge-labeled tree 300 may be ignored is discussed below. The technique, called pruning, requires the construction of a composite automaton.

An automaton includes transitions much like the schema 400. However, the states of an automaton do not represent nodes but rather are states of a state machine. The transitions between states correspond to strings of a path expression for an edge-labeled tree. For example, the path expression $$\text{Select p Where *.Dept.*.Project.p in DB} \qquad (1)$$

produces a list of p where p satisfies the conditions of the Where clause. The Where clause specifies that p must be preceded by a "path" that contains a Dept edge and a Project edge in that order. Thus, referring to FIG. 3, the above path expression would result in nodes 309 and 313. Path refers to the sequence of labels (strings) of an edge-labeled tree. A similar meaning for path applies to a schema or automaton.

Figure 5:
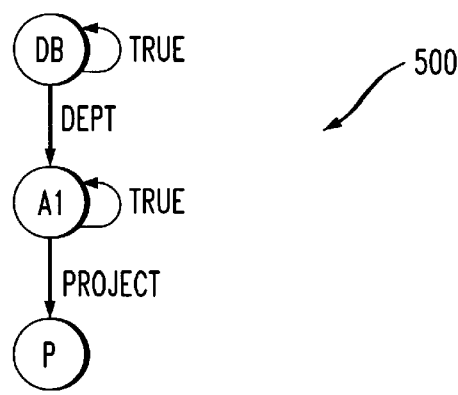
FIG. 5 shows a second schema for the database represented by FIG. 3

The above path expression (1) corresponds to an automaton 500 as shown in FIG. 5. The automaton 500 has an initial state labeled DB. The DB state indicates the starting point when traversing the automaton based on the path expression.

A Dept transition and a True transition emanate from the DB state. The Dept transition indicates that if a Dept edge is encountered in the database as modeled by the edge-labeled tree 300, then the automaton transitions from the DB state to an A1 state. Otherwise, the automaton 500 returns to the DB state via the True transition. Thus, the True transition corresponds to the asterisk preceding Dept in the path expression. The automaton remains in the DB state until the Dept edge is encountered in the edge-labeled tree 300.

When in the A1 state, the automaton will remain in the A1 state until a Project edge is encountered in the database modeled by the edge-labeled tree 300. When the Project edge is encountered, the automaton 500 transitions from the A1 state to a p state. The p state is a terminal state of the automaton 500.

The automaton 500 responds to a string sequence that is identical to the path expression. Thus, the automaton 500 models the path expression and is equivalent to it.

Figure 6:
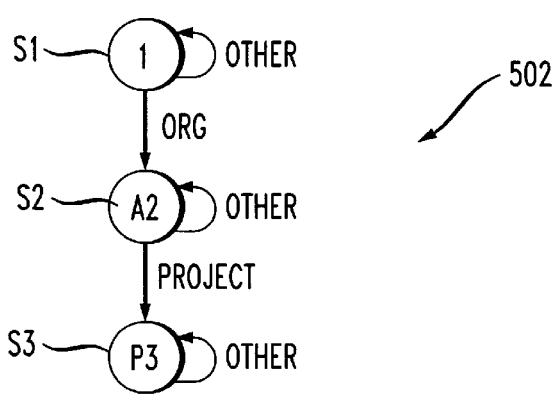
FIG. 6 shows an automaton representing a path expression.

FIG. 6 shows a simplified schema 502 for the edge-labeled tree 300. The schema 502 has three states S1–S3. An Org arrow emanates from state S1 and terminates at state S2. Org represents all the Labs/Centers and Departments as shown in FIG. 3. Thus, Computer Sciences, Math Lab and Administrative Center are included in a list of labels corresponding to Org. The Software Engineering Department, Database Department, Algorithms Department, Cryptography department as well as the Human Resources Department are also included in the list corresponding to Org.

The arrow between S2 and S3 is labeled Project. Thus, all of the Project edges of the edge-labeled tree are included in a list corresponding to Project.

The arrows labeled "Other" are simply the negation of all the edges already discussed above. Thus, the Other arrows that emanates and terminates from/to S1 and S2 are equivalent to arrows labeled not(Org) AND not(Project).

Figure 7:
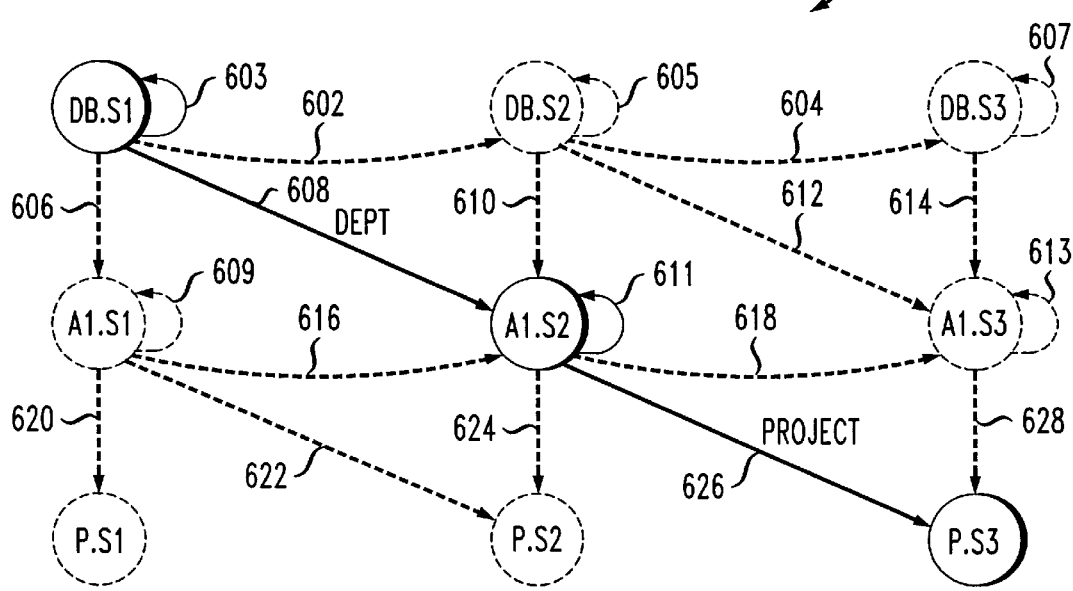
FIG. 7 shows a first composite automaton.

In order to determine which portions of the edge-labeled tree 300 may be ignored when executing the path expression as represented by the automaton 500, a composite automaton 504, as shown in FIG. 7, must be constructed that has a state corresponding to each combination of states of the automaton 500 and the schema 502. A path (sequence of labels or a string) exists in the composite automaton if all transitions of the path are True (or if possible). If a path exists from the starting state (DB.S1) to a terminating state (P.S1, P.S2 and P.S3), then that path leads to the desired information determined by the automaton 500. However, a path does not exist if any transition of the path is False. If any transition that connects the starting state and one of the terminal states of the composite automaton is False, then the portion of the edge-labeled tree corresponding to this "broken path" may be ignored when searching for the desired information as defined by the path expression.

There are nine states in the composite automaton 504 because the automaton 500 has three states, the schema 502 has three states. The starting state of the composite automaton corresponds to the starting states of the automaton 500 and the schema 502. Thus, the starting state is labeled DB.S1. The terminal states of the composite automaton 504 are those states that correspond to the P state of the automaton 500. Thus, there are three terminal states of the composite automaton: P.S1, P.S2 and P.S3.

The transitions between the states 602–628 of the composite automaton 504, may be determined to be True or False by traversing both the automaton 500 and the schema 502. For example, the transition 608 from state DB.S1 to state A1.S2 corresponds to the transition of the automaton 500 from DB to A1 and the Org arrow of the schema 502 from S1 to S2. Thus, transition 608 is True and is traversed only if a Dept edge was encountered in the edge-labeled tree 300 because the Dept edge causes both the automaton 510 to transition from state DB to state A1 and the schema to transition from S1 to S2. Similarly, the transition 626 from A1.S2 to P.S3 is True and corresponds to the transition of the automaton 500 from A1 to P and the schema 502 from S2 to S3. This transition 626 is traversed only if the Project edge is encountered. Thus, the path from DB.S1 to A1.S2 to P.S3 is a path that exists.

Three other transitions 602, 603 and 606 emanate from DB.S1. The transition 603 corresponds to encountering an edge that is not (Org). While the edge Project may theoretically occur, from the schema 602, the Other arrow cannot include Project. Thus, Project will never be encountered in databases conforming to the schema 502.

When a not(Org) is encountered, the automaton takes the True transition from DB to DB and the schema transitions from S1 to S1. Thus, not(Org) causes the composite automaton to transition from DB.S1 to DB.S1.

The transition 602 occurs when an Org is encountered that is not(Dept). Thus, transition 602 is true. The transition 606 occurs when a Dept edge is encountered that is not(Org).

The transition 606 is False because Dept is in the list that corresponds to Org and the schema 502 would transition from S1 to S2 when Dept edge is encountered. Thus, the transition 606 is False and transitions 609, 616, 620 and 622 are all False because these transitions would never be encountered.

Transition 605 going from DB.S2 to DB.S2 is True and occurs when neither Dept nor Project is encountered. Transition 604 is True and occurs when Project is encountered; transition 610 is False because Org cannot emanate from S2 of the schema 502 and transition 612 is False for the same reason.

The transition 607 is True and occurs when an edge other than Dept is encountered. The transition 614 is False because Org cannot emanate from S3 of the schema 502. The transitions 618 and 624 are False because when Project is encountered, the automaton 500 transitions to the P state and the schema 502 transitions to the S3 state.

Transition 611 is True and occurs when an edge that is not(Project) occurs. Transition 613 is False because transitions 612 and 614 are False.

In view of the above, All other transitions transitions other than 603, 608, 611 and 626 are False and are part of broken paths. Thus, portions of the edge-labeled tree 300 that correspond to these transitions the transitions other than 603, 608, 611 and 626 may be ignored when processing the path expression (1). Based on the above analysis, when searching for the desired information defined by the path expression (1), start at the nodes of the edge-labeled tree 300 that are in the extent of S1 and look only for a Dept edge. All other Org edges may be safely ignored because no other Org edges will lead to the desired information.

It may be necessary to transition through many not(Org) edges to reach nodes in the extent of S1 that has Dept edges emanating from them, but searching the database corresponding to transitions 602, 604, 605, 607, 610, 612, 614 and 628 is avoided because these transitions are False and are "pruned" from the composite automaton 504. The portion of the edge-labeled tree 300 that corresponds to these transitions are also pruned and thus the time required to traverse these transitions are avoided.

After traversing the Dept edge, all further nodes must be searched. While transitions 618 and 624 are theoretically possible, the schema 502 indicates that the edges in the edge-labeled tree corresponding to the transitions 618 and 624 do not exist in the database and thus would never be encountered.

Another technique for executing path expressions requires that the database be first preprocessed to determine the nodes that corresponds to the extent of each state of a schema such as the schema 502. This preprocessing would be performed only once corresponding to each schema. After the preprocessing step, a pruned composite automaton is analyzed to determine which of the states of the composite automaton may serve as starting states so that a search for the desired information may skip over all portions of the edge-labeled tree that are hierarchically above those nodes that correspond to the starting states and begin the process deep into the edge-labeled tree at the nodes corresponding to the extends of the newly defined starting states.

If the starting states are in fact terminal states of the automaton that models the path expression specifying the desired information, then a search may be avoided altogether and the desired information may be retrieved immediately. However, in general some search would be required.

Figure 8:
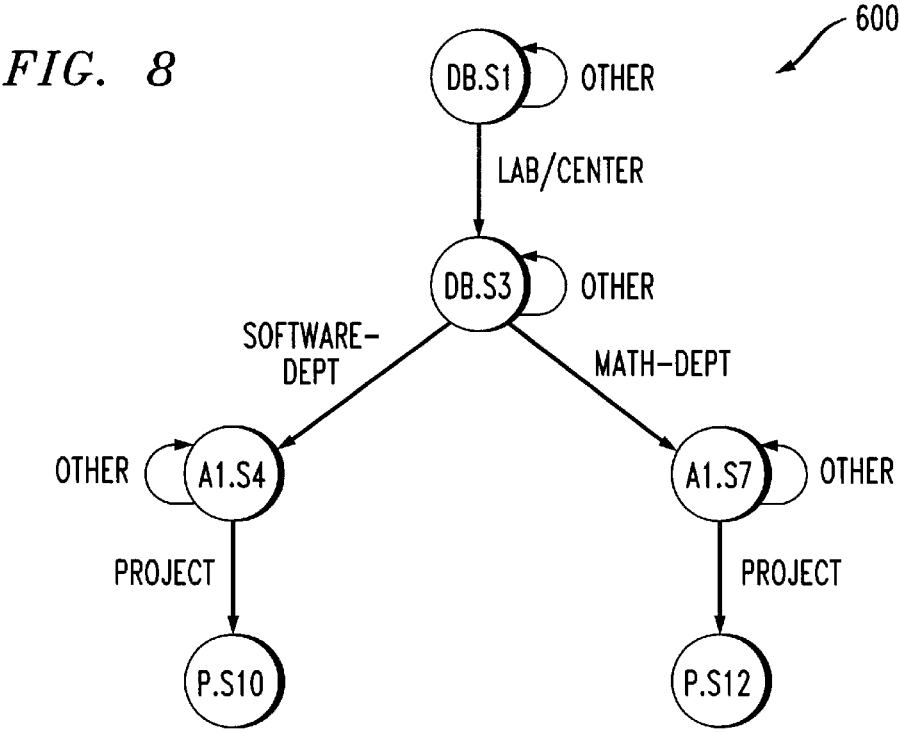
FIG. 8 shows a pruned first composite automaton.

FIG. 8 shows a prune composite automaton 600 that is a composite of the automaton 500 shown in FIG. 5 and the schema 400 shown in FIG. 4. Because the composite automaton 600 is a pruned automaton, all the paths from the initial state DB.S1 to the terminal states P.S10 and P.S12 exists and leads to the desired information. However, it may not be necessary to process all the transitions starting with the state DB.S1. If it is possible to begin searching for the desired information starting with DB.S3, then the processing time required to traverse all the edges corresponding to the Other transition emanating and terminating at DB.S1 and Lab/Center transition emanating from DB.S1 and terminating at DB.S3 may be avoided. Similarly, if the search may begin starting at A1.S4, all the processing time required to traverse all the edges corresponding to the prior transition may be avoided.

In FIG. 8, when states below DB.S3 is selected as a starting state, portions of the composite automaton 600 may be inadvertently ignored and thus not all the desired information will be retrieved. Thus, it is necessary not only to determine that the starting state will lead to the desired information (sound condition), but that all the possible starting states are identified (complete condition) so that the resulting searches are equivalent to the search starting with DB.S1.

For the composite automaton 600 shown in FIG. 8, there are six states: DB.S1, DB.S3, A1.S4, A1.S7, P.S10 and P.S12. Thus, theoretically it is possible to have 26 combination of these states where each combination serves as a possible set of starting states. For example, each of the states of the composite automaton 600 individually may be a starting state. Then, each pair of the states of the composite automaton 600 may serve as starting states such as DB.S1 and DB.S3 or A1.S4 and A1.S7. This process of selecting a subset of starting states may continue until all possible combinations are exhausted resulting in 26 number of possible sets of starting states.

Certain combinations of states may be eliminated at the outset such as the set of starting states that includes DB.S1 and DB.S3. This set of starting states is not selected because a search starting at DB.S1 includes a search starting at DB.S3. Thus, if a search is started at DB.S1, the second search starting at DB.S3 would not be necessary. However, the set of starting states that includes A1.S4 and A1.S7 are not redundant.

Figure 9:
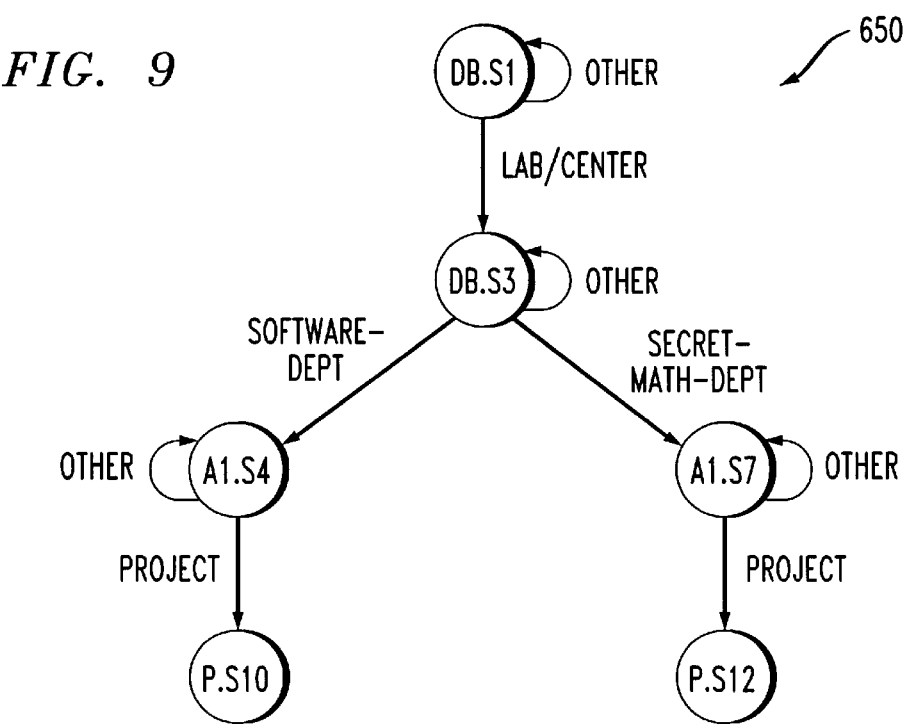
FIG. 9 shows a second composite automaton.

If the desired information is contained in P.S10 and P.S12, then starting at A1.S4 and A1.S7 will lead to the complete set of desired information specified by the path expression (1). This conclusion may be immediately apparent because the Software-Dept edge and the Math-Dept edge matches the corresponding edges in the schema 400. For the composite automaton shown in 600, the terminal states P.S10 and P.S12 may be selected as the most efficient starting states because no search is required. However, if the Math-Dept transition is modified to be Secret-Math-Dept transition in a composite automaton 650 as shown in FIG. 9, then selecting A1.S4 and A1.S7 as starting states may not lead to the correct search.

The composite automaton 650 is more difficult because the schema 400 only provides extents to state S7 that results from traversing the Math-Dept edge in the edge-labeled tree 300. Thus, assuming that Secret-Math-Dept edge is a subset of the Math-Dept edge, the extent of S7 may be far larger than required for traversing the Secret-Math-Dept edge.

For example, if the edge-labeled tree 300 only contains one Secret-Math-Dept edge between a node in the extent of S3 and a node in the extent of S7 and a thousand other edges that are in the list corresponding to the Math-Dept edge, then beginning the search starting with the extent S7 will be highly inefficient.

Further, there may be no way for determining which of the nodes in the extent of S7 are preceded by a Secret-Math-Dept edge because nodes do not include information regarding preceding edges. Thus, the desired information cannot be distinguished from all the information below the extent of S7 when starting with the extent of S7. Accordingly, starting with the extent of S7 would be incorrect unless the Secret-Math-Dept happens to be the only edge emanating from the extent of S7.

In addition, if Secret-Math-Dept edge is not included in the Math-Dept transition, then selecting A1.S4 and A1.S7 as starting states would be incorrect because Secret-Math-Dept cannot be reached from the extent of S7. Thus, it is necessary to verify for each subset of starting states that those starting states would lead to a most optimum and complete solution that achieves the same function as the original path expressions (1).

One technique for verifying whether a set of starting states is equivalent to the starting state DB.S1 is to construct a hybrid automaton by merging the schema with the composite automaton using ∈ transitions. An ∈ transition is used to connect a state in the selected subset of starting states with the corresponding state in the schema.

Figure 10:
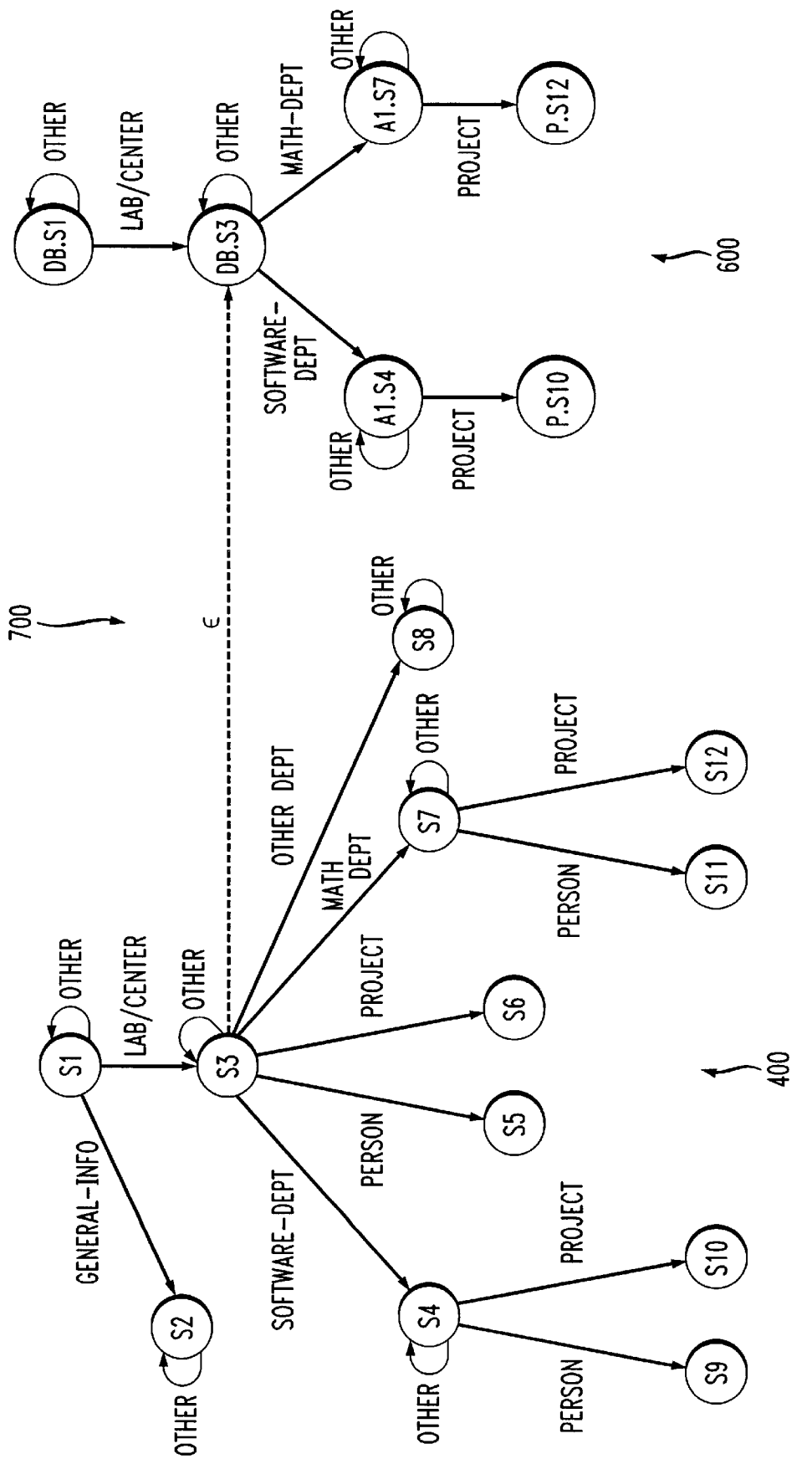
FIG. 10 shows a hybrid automaton.

For example, FIG. 10 shows a hybrid automaton 700 connecting the state S3 of schema 400 to the state DB.S3 of the composite automaton 600. This hybrid automaton 700 would correspond to the subset of starting states that only include DB.S3. The starting state of the hybrid automaton 700 is state S1 of the schema 400. The states of the hybrid automaton 700 are S1, S3, DB.S3, A1.S4, A1.S7, P.S10 and P.S12. The ∈ transition essentially combines S3 together with DB.S3 so that the Lab/Center transition terminates at S3 and DB.S3 simultaneously. However, Math-Dept transitions from DB.S3 to A1.S7. Thus, transitions corresponding to arrows Software-Dept, Person, Project, Math-Dept, and Other Dept are deleted. Also, because S1 is the starting state of the hybrid automaton 700, DB.S1 and the Lab/Center transition of the composite automaton 600 are also deleted. In addition, General-Info arrow and state S2 are deleted because these are not part of the path from S1 to DB.S3.

To determine whether starting the search at DB.S3 would result in an equivalent search as starting at DB.S1, the hybrid automaton 700 is "simulated" against the composite automaton 600. Simulation is a well known technique to one of ordinary skill in the art and essentially compares the hybrid automaton 700 with the composite automaton 600 to determine identity. Identity is defined as all strings that are valid for the hybrid automaton 700 is also valid for the composite automaton 600 and vise versa.

While many different methods for simulating the hybrid automaton 700 against the composite automaton 600 may be used, well known simulation techniques require that both the hybrid automaton 700 and the composite automaton 600 be deterministic. Thus, before simulating the hybrid automaton 700 against the composite automaton 600, the composite automaton 600 must be made deterministic by ensuring that the transitions emanating from each state has a unique label. That is, two transitions emanating from the same state have labels that are disjoined from each other.

If a simulation exists between the hybrid automaton 700 and the composite automaton 600, then the selected subset of starting states is determined to be complete which means that all the transitions and states prior to the subset of starting states may be ignored and thus the processing time required to traverse those states and transitions may be avoided.

The above process may determine that multiple subsets of starting states are equivalent to the starting state DB.S1. Selecting which of the subsets of starting states is the most efficient will require additional cost models associated with each of the subsets of starting states. Costs corresponding to the different subsets of starting states may be compared to select the subset of starting states that is most optimal.

Based on the simulation process described above, the subsets of starting states for the composite automaton 600 is as follows: 1) DB.S1; 2) DB.S3; 3) A1.S4 and A1.S7; 4)

P.S10 and P.S12; 5) A1.S4 and P.S12; and 6) P.S10 and A1.S7. Thus, based on additional cost modeling, one of these subsets may be selected as the most optimal. However, since P.S10 and P.S12 are one of the subsets, these are immediately determined to be the most optimal because no searching is necessary.

As indicated above, a simulation process may require that the composite automaton 600 be made deterministic. A large amount of processing may be required to convert the composite automaton 600 into a deterministic automaton. In some cases, such a task may not be possible. In this case, the simulation process may be attempted to select subsets of starting states without generating a deterministic automation. If the simulation process fails due to the nondeterministic nature of the composite automaton, the simulation process would be inconclusive. While not all subsets of starting states may be discovered, some subsets of starting states may be determined in less time than required to exhaustively search the original database. Thus, depending on the characteristic of the composite automaton, different approaches to simulation and selection of subset of starting states may be applied to achieve improved processing time as compared to an exhaustive search.

While this invention has been described in conjunction with specific embodiments thereof, it is evident that many alternatives, modification and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A method for processing a database modeled as an edged-labeled tree to obtain desired information, comprising:
   identifying at least one path of the edged-labeled tree that does not contain the desired information; and
   processing the database with a composite automation which includes a schema having known structure and unknown structure, to retrieve the desired information without processing the identified path of the edge-labeled tree.

2. The method of claim 1, wherein the identifying step comprises:
   generating an automaton based on the desired information;
   generating the composite automaton by combining a schema of the database with the automaton; and
   analyzing the composite automaton to identify broken paths.

3. The method of claim 2, further comprising selecting portions of the automaton that does not correspond to the broken paths of the composite automaton.

4. The method of claim 3, wherein the processing step comprises:
   identifying paths of the selected portions of the automaton; and
   traversing the edge-labeled tree according to each of the identified paths.

5. The method of claim 4, wherein each node of the edge-labeled tree corresponding to each state of the schema along the each of the identified paths are traversed.

6. The method of claim 2, wherein the generating an automaton step comprises:
   generating an expression for the desired information based on the edge-labeled tree; and constructing the automaton that corresponds to the expression.

7. The method of claim 2, wherein the generating a composite automaton step comprises:
   generating product states, each of the product states corresponding to a state from the schema and a state from the automaton; and
   connecting the product states together with transitions based on transitions of the schema and the automaton.

8. The method of claim 2, wherein the analyzing step comprises:
   identifying at least one path of the composite automaton that does not terminate in a state that corresponds to a terminal state of the automaton; and
   identifying the at least one path as one of the broken paths.

9. A database processing device processing a database modeled as an edge-labeled tree, comprising:
   a memory;
   a controller coupled to the memory, the controller identifying at least one path of the edged-labeled tree that does not contain desired information and processing the database with a composite automation which includes a schema having known structure and unknown structure, to retrieve the desired information without processing the identified path of the edge-labeled tree.

10. The device of claim 9, wherein the controller generates an automaton based on the desired information, generates the composite automaton by combining a schema of the database with the automaton, and analyzes the composite automaton to identify broken paths.

11. The device of claim 10, wherein the controller selects portions of the automaton that does not correspond to the broken paths of the composite automaton.

12. The device of claim 11, wherein the controller identifies paths of the selected portions of the automaton; and traverses the edge-labeled tree according to each of the identified paths.

13. The device of claim 12, wherein each node of the edge-labeled tree corresponding to each state of the schema along the each of the identified paths are traversed.

14. The device of claim 10, wherein the controller receives an expression for the desired information and constructs the automation that corresponds to the expression.

15. The device of claim 10, wherein the controller generates product states, each of the product states corresponding to a state from the schema and a state from the automaton, the controller connecting the product states together with transitions based on transitions of the schema and the automaton.

16. The device of claim 10, wherein the controller identifies at least one path of the composite automaton that does not terminate in a state that corresponds to a terminal state of the automaton and identifies the at least one path as one of the broken paths.

17. A method for processing a database modeled as an edge-labeled tree to obtain desired information, comprising:
   identifying at least one node within the edge-labeled tree as a starting node;
   bypassing a portion of the edge-labeled tree that precedes the starting node; and
   processing the database with a composite automation which includes a schema having known structure and unknown structure, in a forward direction starting at the starting node for the desired information.

18. The method of claim 17, wherein the identifying step comprises:
   generating the composite automaton;

pruning the composite automaton;

selecting at least one state of the pruned composite automaton; and identifying at least one node of the edge-labeled tree corresponding to the selected state of the pruned composite automaton as the starting node.

19. The method of claim 18, wherein the generating a composite automaton step comprises:

generating product states, each of the product states corresponding to a state from a schema of the database and a state from an automaton that corresponds to the desired information; and connecting the product states together with transitions based on transitions of the schema and the automaton.

20. The method of claim 18, wherein the pruning step comprises:

identifying broken paths of the composite automaton; and generating the pruned automaton by removing portions of the composite automaton that corresponds only to the broken paths.

21. The method of claim 20, wherein the selecting step comprises:

forming a hybrid automaton based on a state of the pruned automaton and a schema of the database;

simulating the hybrid automaton against the pruned automaton; and selecting the state based on a result of the simulating step.

22. The method of claim 21, wherein the forming a hybrid automaton step comprises:

connecting a state in the schema that corresponds to the state in the automaton with an $\epsilon$ edge; and combining a path of the schema from an initial state of the schema to the state that corresponds to the state in the automaton with all paths of the automaton below the state.

23. The method of claim 21, wherein the simulating step comprises:

identifying an initial state and terminal states of the hybrid automaton and an initial state and terminal states of the automaton;

generating hybrid strings by traversing the hybrid automaton from the initial state to anyone of the terminal states;

generating strings by traversing the automaton from the initial state to anyone of the terminal states; and verifying that each of the strings of the hybrid automaton is identical to a unique one of the strings of the automaton.

24. The method of claim 23 wherein the simulation exists if the verifying step is successful.

25. The method of claim 21, wherein the selecting step selects the state only if a simulation exists.

26. A database processing device processing a database modeled as an edge-labeled tree, comprising:

a memory;

a controller coupled to the memory, the controller identifying at least one node within the edge-labeled tree as a starting node, bypassing a portion of the edge-labeled tree preceding the at least one node, and processing the database with a composite automation which includes a schema having known structure and unknown structure starting at the at least one node for desired information.

27. The device of claim 26, wherein the controller generates the composite automaton, prunes the composite automaton, selects at least one state of the pruned composite automaton, and identifies at least one node of the edge-labeled tree corresponding to the selected state of the pruned composite automaton as the starting node.

28. The device of claim 27, wherein the controller generates product states, each of the product states corresponding to a state from a schema of the database and a state from an automaton that corresponds to the desired information, the controller connecting the product states together with transitions based on transitions of the schema and the automaton.

29. The device of claim 27, wherein the controller identifies broken paths of the composite automaton, and generates the pruned automaton by removing portions of the composite automaton that corresponds only to the broken paths.

30. The device of claim 29, wherein the controller forms a hybrid automaton based on a state of the pruned automaton and a schema of the database, simulates the hybrid automaton against the pruned automaton, and selects the state based on a result of the simulating step.

31. The device of claim 30, wherein the controller connects a state in the schema that corresponds to the state in the automaton with an $\epsilon$ edge, and combines a path of the schema from an initial state of the schema to the state that corresponds to the state in the automaton with all paths of the automaton below the state.

32. The device of claim 30, wherein the controller identifies an initial state and terminal states of the hybrid automaton and an initial state and terminal states of the automaton, generates hybrid strings by traversing the hybrid automaton from the initial state to anyone of the terminal states, generates strings by traversing the automaton from the initial state to anyone of the terminal states, and verifies that each of the strings of the hybrid automaton is identical to a unique one of the strings of the automaton.

33. The device of claim 32, wherein the simulation exists if each of the strings of the hybrid automaton is identical to a unique one of the strings of the automaton.

34. The device of claim 30, wherein the controller selects the state only if a simulation exists.

35. The device of claim 26, wherein the database represents the information contained in a network.

36. The device of claim 35, wherein the network is the Internet and the database represents home pages and information within the home pages.

* * * * *